United States Patent
Leufstedt

(10) Patent No.: US 8,691,310 B2
(45) Date of Patent: Apr. 8, 2014

(54) METHOD OF EXTENDING THE PRODUCTION TIME OF A PASTEURISER

(75) Inventor: Max Leufstedt, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 15 days.

(21) Appl. No.: 13/496,038

(22) PCT Filed: Sep. 14, 2010

(86) PCT No.: PCT/SE2010/000223
§ 371 (c)(1),
(2), (4) Date: Apr. 25, 2012

(87) PCT Pub. No.: WO2011/034481
PCT Pub. Date: Mar. 24, 2011

(65) Prior Publication Data
US 2012/0207902 A1    Aug. 16, 2012

(30) Foreign Application Priority Data
Sep. 15, 2009 (SE) .................................. 0901184-2

(51) Int. Cl.
*A23L 3/16* (2006.01)

(52) U.S. Cl.
USPC ........... 426/521; 426/231; 426/522; 426/590; 426/580; 99/453; 99/275; 99/483; 422/1

(58) Field of Classification Search
USPC ............ 426/521, 580, 231, 522, 590; 99/453, 99/275, 483; 422/1
See application file for complete search history.

(56) References Cited

U.S. PATENT DOCUMENTS

| | | | | |
|---|---|---|---|---|
| 3,101,041 A | * | 8/1963 | Hallstrom | 99/468 |
| 4,416,194 A | * | 11/1983 | Kemp | 99/275 |
| 5,950,715 A | | 9/1999 | Jonsson et al. | |
| 6,136,362 A | * | 10/2000 | Ashton | 426/521 |
| 6,373,092 B1 | * | 4/2002 | Okumoto | 257/309 |
| 6,737,092 B1 | | 5/2004 | Goransson et al. | |
| 2005/0112258 A1 | * | 5/2005 | Feldmeier | 426/521 |

FOREIGN PATENT DOCUMENTS

| | | |
|---|---|---|
| WO | WO 97/00415 A1 | 1/1997 |
| WO | WO 99/55175 A1 | 11/1999 |
| WO | WO 2009/091268 A1 | 7/2009 |

OTHER PUBLICATIONS

International Search Report (PCT/ISA/210) issued on Nov. 12, 2010, by Swedish Patent Office as the International Searching Authority for International Application No. PCT/SE2010/000223.

* cited by examiner

*Primary Examiner* — Drew Becker
*Assistant Examiner* — Preston Smith
(74) *Attorney, Agent, or Firm* — Buchanan Ingersoll & Rooney PC

(57) ABSTRACT

The invention relates to a method of extending the production time of a pasteuriser. The pasteuriser is of the type which includes a plate heat exchanger with a number of sections, of which at least one section consists of regenerative section. The method comprises raising the temperature in the downstream part of the regenerative section to a temperature above 50° C., during a certain predetermined period of time and at regular intervals. During normal production, a part quantity of the product which passes downstream of the regenerative section is shunted past the regenerative section. At the regular intervals and during the predetermined period of time, a part quantity of the product which passes upstream of the regenerative section is shunted past the regenerative section. At the same time, all product passes the downstream part of the regenerative section during the predetermined period of time.

8 Claims, 3 Drawing Sheets

METHOD OF EXTENDING THE PRODUCTION TIME OF A PASTEURISER

TECHNICAL FIELD

The present invention relates to a method of extending the production time of a pasteuriser, the pasteuriser being of the type which comprises a plate heat exchanger with a number of sections, of which at least one section consists of a regenerative section, the method comprising the step that the temperature in the downstream part of the regenerative section is raised to a temperature above 50° C., during a given predetermined period of time and at regular intervals.

BACKGROUND ART

The pasteurisation of milk intended for consumption or as a raw material for cheese making is a well-known process within the dairy industry. Cold milk is heated to a temperature of 63-75° C. and is held at this temperature for a given predetermined period of time. The commonest temperature range, in particular as regards milk for cheese making, is 72-75° C. and with a time duration of 15-20 seconds.

Normally, pasteurisation takes place in a plate heat exchanger and, in order to realise as efficient a heating as possible, one section in the plate heat exchanger is regenerative. This implies that the incoming cold milk is heated up by the already heated milk which in its turn is cooled down by the cold milk.

Despite the pasteurisation process, a number of bacteria normally occurring in the milk, such as *Streptococcus thermophilus*, survive. These bacteria grow at a temperature of 35-50° C. The milk is at this temperature downstream in a part of the regenerative section of the heat exchanger and bacteria there can grow to a so-called biofilm. After roughly ten hours' production, the biofilm has normally grown so much that it releases from the plate heat exchanger and accompanies the pasteurized milk. Apart from the fact that it is not desirable to have biofilm in consumer milk, milk with biofilm is directly unsuitable to use as a raw material for cheese making. As a result, it is commonest practice to stop production after ten hours and wash the equipment.

Since the intention today is to achieve production times of 20 hours and above in order to render production more efficient, solutions are being sought to remove the biofilm from the downstream part of the regenerative section. One solution is to provide double regenerative sections in the plate heat exchanger and be able to switch between them when one of the regenerative sections is being washed. This is an expensive solution which requires a huge capital investment cost.

In an article by G. C. Knight, R. S. Nicol, T. A. Meekin; "Temperature step changes: a novel approach to control biofilms of *Streptococcus thermophilus* in a pilot plant-scale cheese-milk pasteurisation plant"; International Journal of Food Microbiology; 93 (2004); pages 305-318, there is a description of how, with recurring temperature increases in the downstream part of the regenerative section, it is possible to prevent biofilm from growing so that it releases from the plate heat exchanger. The temperature increases are realised by raising, in a first heating section, the temperature of the milk which enters into the upstream part of the regenerative section. The described method requires an extra heating section and the supply of more energy to achieve the temporary temperature increases.

OBJECTS OF THE INVENTION

One object of the present invention is to realise a method of extending the production time of a pasteuriser with a minimised increase of energy consumption.

A further object of the present invention is to realise a method of extending the production time of a pasteuriser without costly investments.

Yet a further object of the present invention is that the method may simply be retro-applied to existing pasteurisers.

SOLUTION

These and other objects have been attained according to the present invention in that the method of the type described by way of introduction has been given the characterising features that, during normal production, a part quantity of the product which passes downstream of the regenerative section, is shunted past the regenerative section, and that at those uniform intervals and during the predetermined period of time, a part quantity of the product which passes upstream of the regenerative section is shunted past the regenerative section and that all product downstream passes through the regenerative section during the predetermined period of time.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings.

DESCRIPTION OF PREFERRED EMBODIMENT

Figure 1:
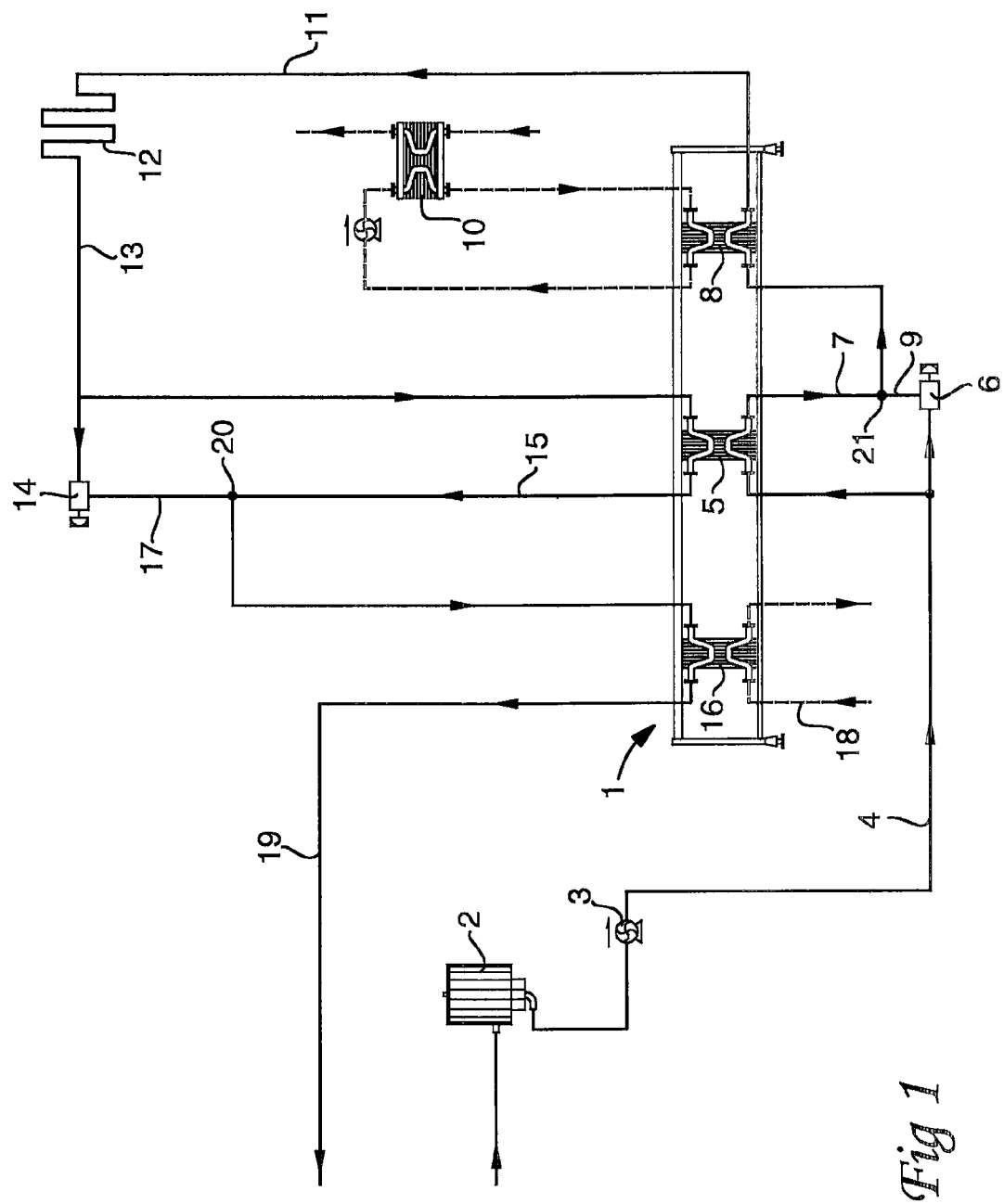
FIG. 1 is a flow diagram of carrying the method according to the present invention into effect.

FIG. 1 shows a flow diagram of a pasteuriser 1, for carrying the method according to the present invention into effect. The pasteuriser 1 consists of a plate heat exchanger with a plurality of sections.

Via a balance tank 2 and a circulation pump 3, the product, which consists of milk, enters into the pasteuriser 1 through a conduit 4. The conduit 4 leads into the second section of the pasteuriser 1 which is a regenerative section 5. The conduit 4 also leads to a valve 6. The valve 6 consists of a conventional regulator valve. From the regenerative section 5 of the pasteuriser 1, a conduit 7 leads to the third part of the pasteuriser which is a heating section 8. From the valve 6, a conduit 9 also connects to the heating section 8.

The heating section 8 is also connected to an apparatus 10 for providing the heating section 8 with hot water. From the heating section 8, the product is led via a conduit 11 to a holding cell 12. The holding cell 12 consists of a tube loop, or alternatively a conduit of a certain predetermined length.

From the holding cell 12, a conduit 13 departs and leads, on the one hand, to the regenerative section 5 and, on the other hand, to a valve 14. The valve 14 consists of conventional regulator valve.

From the downstream part of the regenerative section 5, a conduit 15 leads to the first section of the pasteuriser 1 which consists of a cooling section 16. A conduit 17 from the valve 14 also leads to the cooling section 16. The cooling section 16 is also connected to an apparatus 18 for providing the cooling section 16 with ice water. The product departs from the cooling section 16 and the pasteuriser 1 through a conduit 19.

Under normal production in the pasteuriser 1, the cold product is led into the regenerative section 5 of the pasteuriser 1 through the conduit 4. The valve 6 is closed during normal production, so that all product passes through the upstream part of the regenerative section 5. The product which enters into the regenerative section 5 is at a temperature of approx. 4° C. and is heated in the regenerative section to approx. 40° C. by the already heated product which passes the downstream part of the regenerative section 5.

In the heating section 8, the product is heated further by means of hot water to a temperature of 72-75° C. The heated product is led to the holding cell 12 and is left to stay there during a period of time of 15 seconds.

Under normal production, the valve 14 is open and regulates the flow so that approx. 45% of the total product quantity does not pass the regenerative section 5. Roughly 55% of the product flow passes through the downstream part of the regenerative section 5. At point 20, where the conduits 15 and 17 converge, the two flows are mixed together again. The product in the conduit 17 is at a temperature of approx. 75° C. and the product in the conduit 15 has, on passage of the regenerative section 5, been cooled down by the incoming cold product to a temperature of approx. 4° C. The converged product has a temperature of approx. 35° C.

The division of the product flow is based on the desired pasteurisation temperature and the desired temperature of the product which leaves the pasteuriser 1. If a higher pasteurisation temperature is desired, that proportion of the product flow which is shunted past the downstream part of the regenerative section 5 is reduced. If a higher temperature of the product leaving the pasteuriser 1 is desired, the proportion of the product flow which is shunted past the downstream part of the regenerative section 5 is increased.

If the product, i.e. the milk, is to be used immediately for cheese making, it passes the cooling section 16 of the pasteuriser 1 without being cooled. If the product is to be stored or used for consumer milk, it is cooled in the cooling section 16 by means of ice water to a temperature of approx. 4° C. Thereafter, the product leaves the pasteuriser 1 through the conduit 19.

Figure 2:
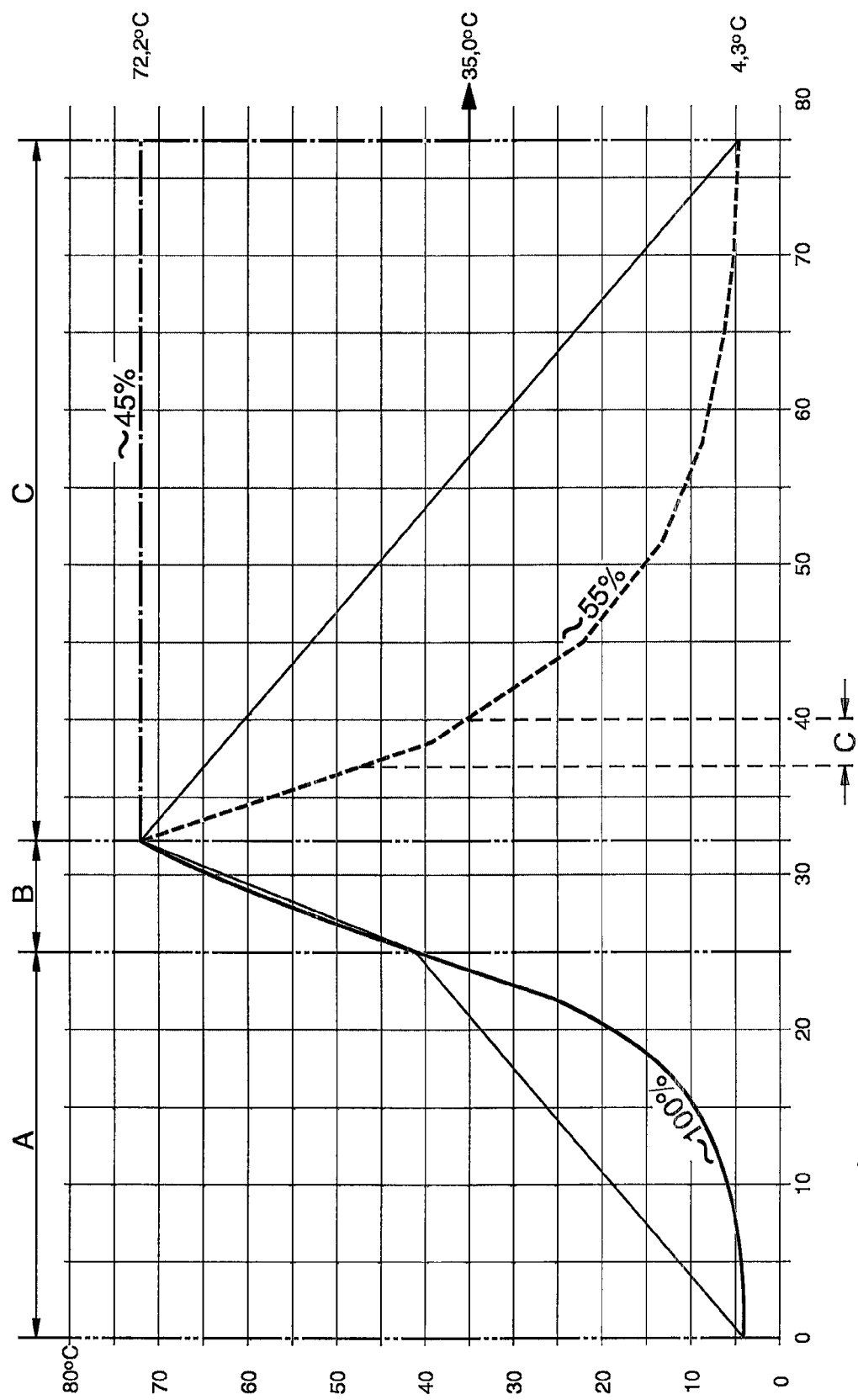
FIG. 2 shows a temperature curve for a pasteuriser, according to the method according to the present invention, during normal production.

FIG. 2 shows the temperature curves for the product through the pasteuriser 1 in normal production according to the present invention. The upstream part of the regenerative section 5 is illustrated in section A. The heating section 8 is illustrated in section B and the downstream part of the regenerative section 5 is illustrated in section C.

Section D in the diagram in FIG. 2 constitutes that part of the downstream part of the regenerative section 5 which maintains a temperature of 35-50° C. It is at this temperature that certain bacteria, such as *Streptococcus thermophilus*, grow and can form a biofilm in the pasteuriser 1 and thereby limit the production time of the pasteuriser 1.

According to the method of the present invention, the temperature in that part of the downstream part of the regenerative section 5 which is affected by biofilm is increased. The temperature increases are to take place at uniform intervals and during a given period of time. The period of time is determined by the desired target temperature. Trials have demonstrated that a temperature increase to more than 50° C. during 10 minutes, regularly recurring after 60 minutes, is sufficient to prevent bacteria from growing and forming a biofilm. By raising the temperature further, it is possible to reduce the time interval, for example a temperature increase to 70-75° C. during 1-2 minutes.

The temperature increase in the downstream part of the regenerative section 5 is realised in that the valve 6 is opened so that approx. 45% of the product flow does not pass through the upstream part of the regenerative section 5. This 45% of the product flow is at a temperature of approx. 4° C. The approx. 55% of the product flow which passes the upstream part of the regenerative section 5 is heated to approx. 72° C.

The distribution of the product flow is based on the desired pasteurising temperature and the desired temperature of the product which departs from the pasteuriser 1. If a higher a pasteurising temperature is desired, that proportion of the product flow which is shunted past the upstream part of the regenerative section 5 is reduced. If a higher temperature of the product leaving the pasteuriser 1 is desired, that proportion of the product flow which is shunted past the upstream part of the regenerative section 5 is increased.

At point 21, where the conduits 7 and 9 converge, the two flows are mixed together again. The intermixed product is at a temperature of approx. 41° C. In the heating section 8, the product is heated further, by means of hot water, to 72-75° C. The heated product is led to the holding cell 12 and is allowed to stay in the cell for a period of time of 15 seconds.

During the time duration when the temperature in the downstream part of the regenerative section 5 is raised, the valve 14 is kept closed. The entire product flow, at a temperature of approx. 72° C., will then pass through the downstream part of the regenerative section 5 and, since the flow of the upstream part is reduced to 45%, there will be a different cooling of the product to the approx. 35° C. which is desired.

If the product, i.e. the milk, is to be used immediately for cheese making, it passes the cooling section 16 in the pasteuriser 1 without being cooled. If the product is to be stored or used for consumer milk, it is cooled in the cooling section 16 by means of ice water to a temperature of approx. 4° C. Thereafter, the product departs from the pasteuriser 1 through the conduit 19.

Figure 3:
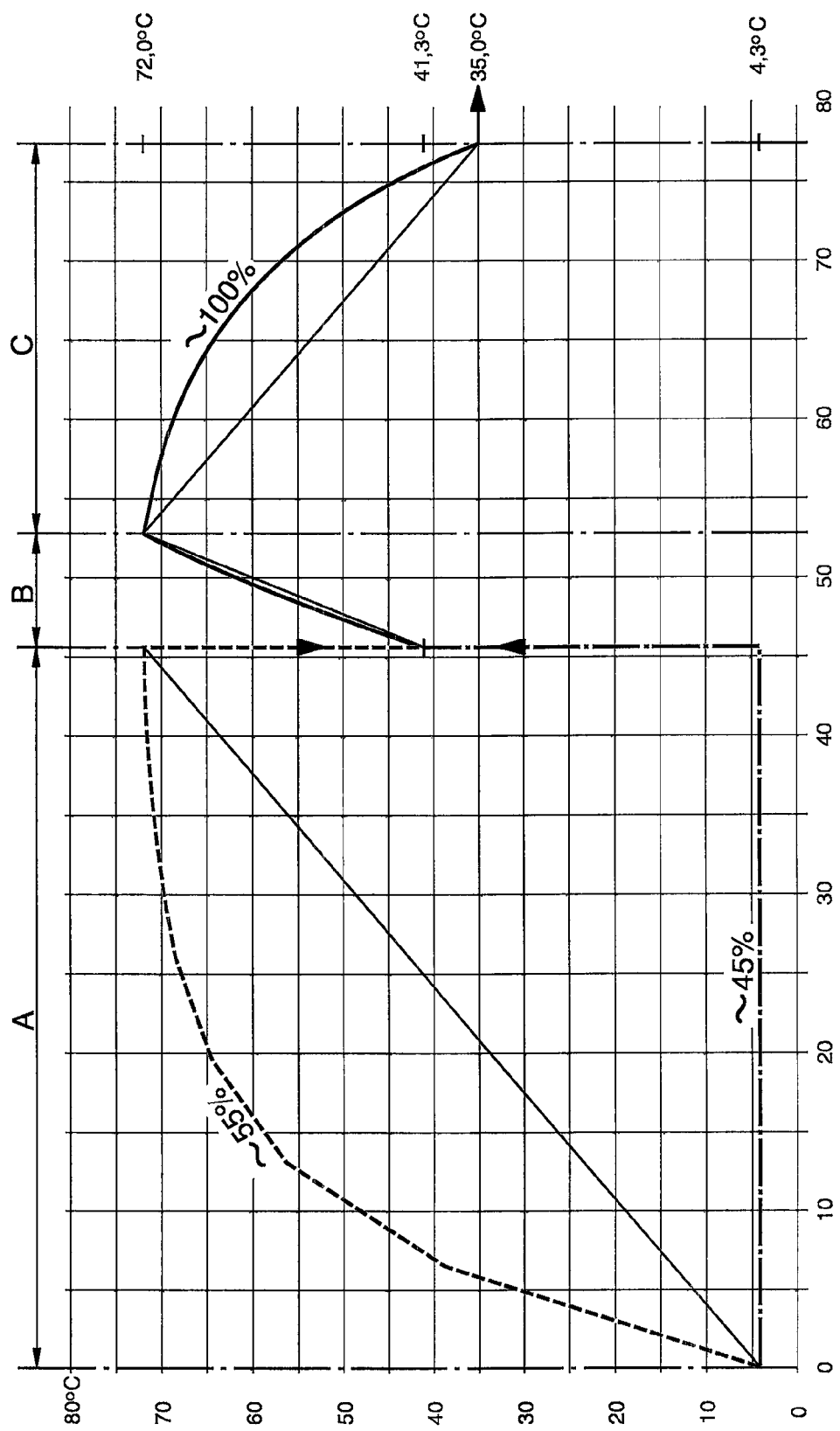
FIG. 3 shows a temperature curve for a pasteuriser, according to the method according to the present invention, during temperature increase in the downstream part of the regenerative section.

FIG. 3 shows the temperature curves for the product through the pasteuriser 1 on a temperature increase according to the present invention, which is to take place at regular intervals and during a given time duration. The upstream part of the regenerative section 5 is illustrated in section A. The heating section 8 is illustrated in section B and the downstream part of the regenerative section 5 is illustrated in section C. In that the temporary temperature increase places the temperature range of 35-50° C. in another part of the downstream part of the regenerative section 5, a biofilm is prevented from building up in any part of the downstream part of the regenerative section 5.

The method is possible in a simple and economical manner to retro-apply to already existing pasteurisers 1. The only feature which is required is that an extra valve, valve 6 at the upstream part of the regenerative section 5, is provided. Other components requisite for carrying the method according to the invention into effect are normally included in a pasteuriser 1. A certain reprogramming of the control program for the pasteuriser 1 is also necessary.

As will have been apparent from the foregoing description, the present invention realises a method of extending the production time of a pasteuriser. The method implies that, with a minimised increase of energy consumption and without costly capital investments, it is possible to increase the production time to at least 20 hours. The method can further be retro-applied to existing pasteurisers in a simple and economical manner.

What is claimed is:

1. A method of extending the production time of a pasteuriser, the pasteuriser being of the type which includes a plate heat exchanger with a number of sections, of which at least one section consists of a regenerative section, the regenerative section including an upstream part and a downstream part configured so that a product flows through the upstream part prior to flowing through the downstream part, the method comprising:

raising the temperature in the downstream part of the regenerative section to a temperature above 50° C., during a certain predetermined period of time and at regular intervals;

during normal production, shunting past the downstream part of the regenerative section a portion of the product which would otherwise flow through the downstream part of the regenerative section; and at the regular intervals and during the predetermined period of time: (i) shunting past the upstream part of the regenerative section a portion of the product which would otherwise flow through the upstream part of the regenerative section; and (ii) passing all of the product through the downstream part of the regenerative section.

2. The method as claimed in claim 1, wherein the portion of the product which is shunted past the downstream part of the regenerative section is approximately 45% of the total product flow and possesses a pasteurisation temperature of 72° C. and a final product temperature of 35° C.

3. The method as claimed in claim 1, wherein the portion of the product which is shunted past the downstream part of the regenerative section is less than 45% of the total product flow and possesses a pasteurisation temperature above 72° C.

4. The method as claimed in claim 1, wherein the portion of the product which is shunted past the downstream part of the regenerative section is greater than 45% of the total product flow and possesses a final product temperature above 35° C.

5. The method as claimed in claim 1, wherein the temperature in the downstream part of the regenerative section is raised to approximately 50-55° C. for 10 minutes every 60 minutes.

6. The method as claimed in claim 1, wherein the temperature in the downstream part of the regenerative section is raised to approximately 70-75° C. for 1-2 minutes.

7. A method of pasteurizing a product by pumping the product through a heat exchanger, the heat exchanger including a regenerative section possessing an upstream part and a downstream part, the product flowing through the upstream part of the regenerative section prior to flowing through the downstream part of the regenerative section, a first valve openable to allow at least a portion of the product to bypass the upstream part of the regenerative section, a second valve openable to allow at least a portion of the product to bypass the downstream part of the regenerative section, the method comprising:

partially opening the second valve so that a portion of the product bypasses the downstream part of the regenerative section; and raising the temperature of the downstream part of the regenerative section above 50° C. to reduce biofilm growth by: (i) partially opening the first valve so that a portion of the product bypasses the upstream part of the regenerative section; and (ii) closing the second valve so that all of the product flows through the downstream part of the regenerative section.

8. The method of claim 7, further comprising closing the first valve, while the second valve is partially opened, so that all of the product flows through the upstream part of the regenerative section.

* * * * *